Nov. 2, 1937. J. C. BROWN 2,097,756
FRUIT PITTER
Filed Nov. 13, 1935
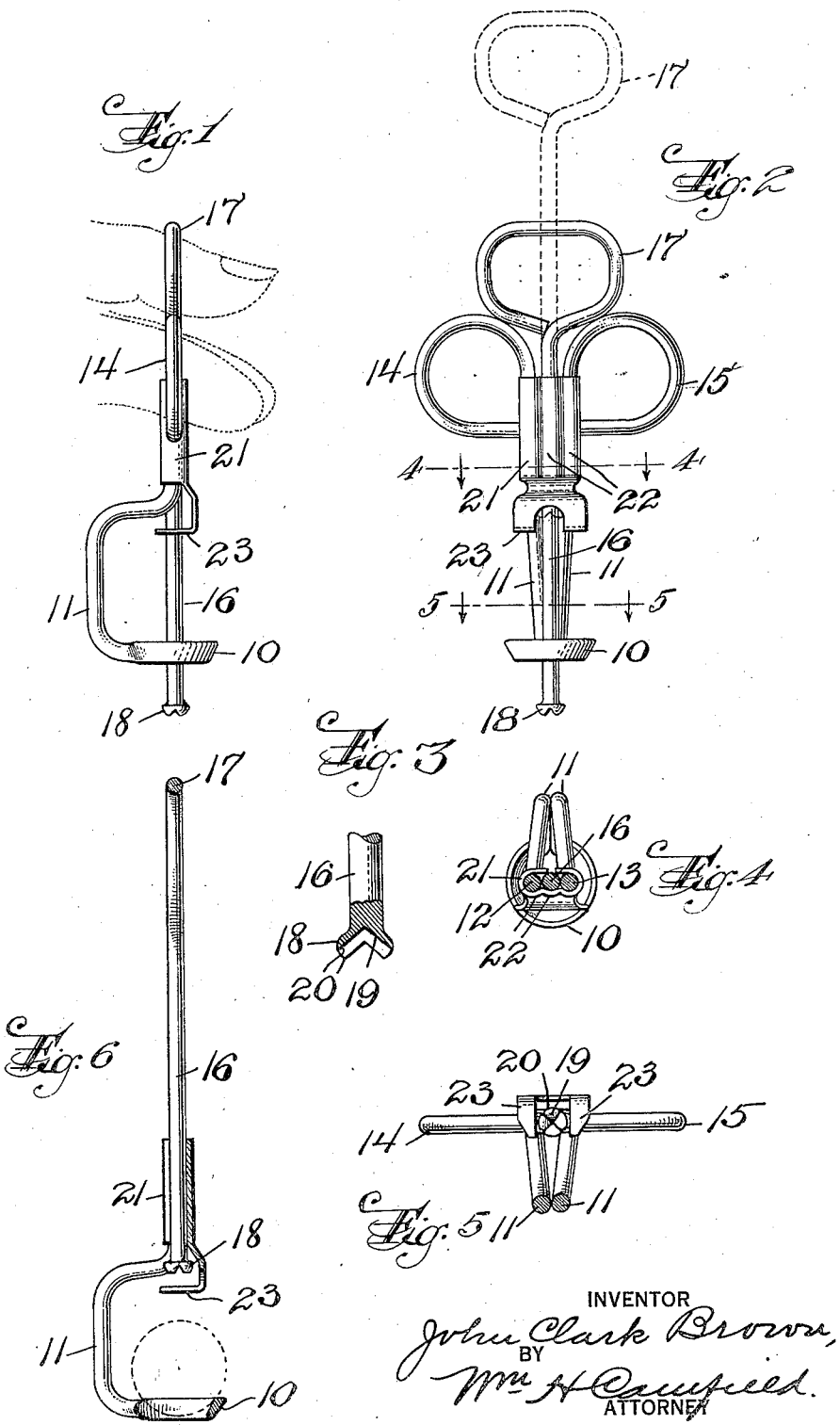
INVENTOR
John Clark Brown,
BY
Wm. H. Caulfield
ATTORNEY Patented Nov. 2, 1937

2,097,756

UNITED STATES PATENT OFFICE 2,097,756

FRUIT PITTER

John Clark Brown, New York, N. Y.

Application November 13, 1935, Serial No. 49,488

2 Claims. (Cl. 146—21)

This invention relates to an improved fruit pitter especially adapted for pitting cherries which pitter is easily operated by one hand, leaving the other hand free for handling the fruit.

The pitter is simple in construction, as it is made mainly of stiff wire formed into two members, one of which receives two fingers of the hand while the other is operated vertically by the thumb.

The device is provided with a seat on which the fruit is placed, the pitter or plunger is operated and then withdrawn, which withdrawal causes the fruit to engage a stripper which allows the pitter or plunger to retreat still further leaving the fruit free. The pitter can thus be operated to deposit pits in one receptacle and the fruit in another receptacle.

The invention resides, further, in certain details of construction which will be hereinafter more fully described and finally embodied in the claims.

The invention is illustrated in the accompanying drawing. Figure 1 is an edge view of the improved stripper with fingers of the hand shown in dotted outline. Figure 2 is a face view of the pitter shown in Figure 1. Figure 3 is a detail of the end of the plunger or pitter. Figure 4 is a section on line 4—4 in Figure 2. Figure 5 is a section on line 5—5 in Figure 2. Figure 6 is a central vertical section of the pitter shown in Figure 2.

The device comprises a wire member bent to form an annular seat 10, the wire being preferably flattened and inclined to provide a recessed seat to hold the fruit, such as a cherry, from rolling. The wire then extends rearwardly and upwardly forming a part 11 and then extends upwardly with two strands 12 and 13 in substantially parallel relation and then bent outwardly to form oppositely extending loops 14 and 15 for receiving fingers of the hand. The pitter or plunger consists of a single straight wire 16 arranged above the centre of the seat 10 and slidable between the strands 12 and 13. The pitter 16 is bent at the top to form a loop 17 for receiving the thumb and its bottom end is adapted to enter the fruit and force the pit from the fruit and through the seat 10.

The bottom end is preferably bulged as at 18 and centrally recessed as at 19 to form the serrated annular cutting edge 20 which structure is of advantage in making a clean cut through the fruit, engaging the pit over considerable area to force it directly downward and allowing an easy stripping of the fruit from the plunger when the fruit rises with the pitter.

The parts are held in firm position by a clip 21 embracing the strands 12 and 13 and the pitter 16 being usually recessed as at 22 to form guides. The clip is made of sheet metal. The clip has its lower end formed with two separated fingers 23 alongside the stripper 16 and below the highest point of the travel of the end 18 of the pitter. These fingers act as strippers to arrest the fruit when it rises with the pitter 16 and the plunger ascends thus leaving the fruit to fall from the device.

In operating the device, two fingers of the hand are placed in the loops 14 and 15 and the thumb is placed in the loop 17. The thumb is raised and the fruit is placed on the seat 10. The thumb is then pushed down forcing the pit from the fruit and into a receptacle over which the device is held. The device then is placed over another receptacle, the thumb is raised which draws the plunger or pitter 16 upwardly and the fruit is stripped from the plunger and drops into the receptacle.

Changes can be made in the form and proportion of parts without departing from the scope of my invention.

I claim:

1. A fruit pitter comprising a wire bent to form an annular seat and then bowed rearwardly and upwardly and then extended in spaced parallel relation and bent over at the top to form outwardly extending finger loops, a second wire slidable between the parallel parts of the first wire and having a finger loop at the top and an annular projecting cutting edge at the bottom, and a stripper secured to the parallel parts of the first wire for stripping fruit from the second wire when the latter ascends.

2. A fruit pitter comprising a wire bent to form an annular seat and then bowed rearwardly and upwardly and then extended in spaced parallel relation and bent over at the top to form outwardly extending finger loops, a second wire slidable between the parallel parts of the first wire and having a finger loop at the top and an annular projecting cutting edge at the bottom, and a clip enclosing the parallel parts of the first wire and the second wire and having a forked bottom end through which the second wire passes for stripping fruit therefrom.

JOHN CLARK BROWN.